Nov. 15, 1927.
G. O. BESSETTE
EGG OPENER
Filed April 1, 1926
1,648,979
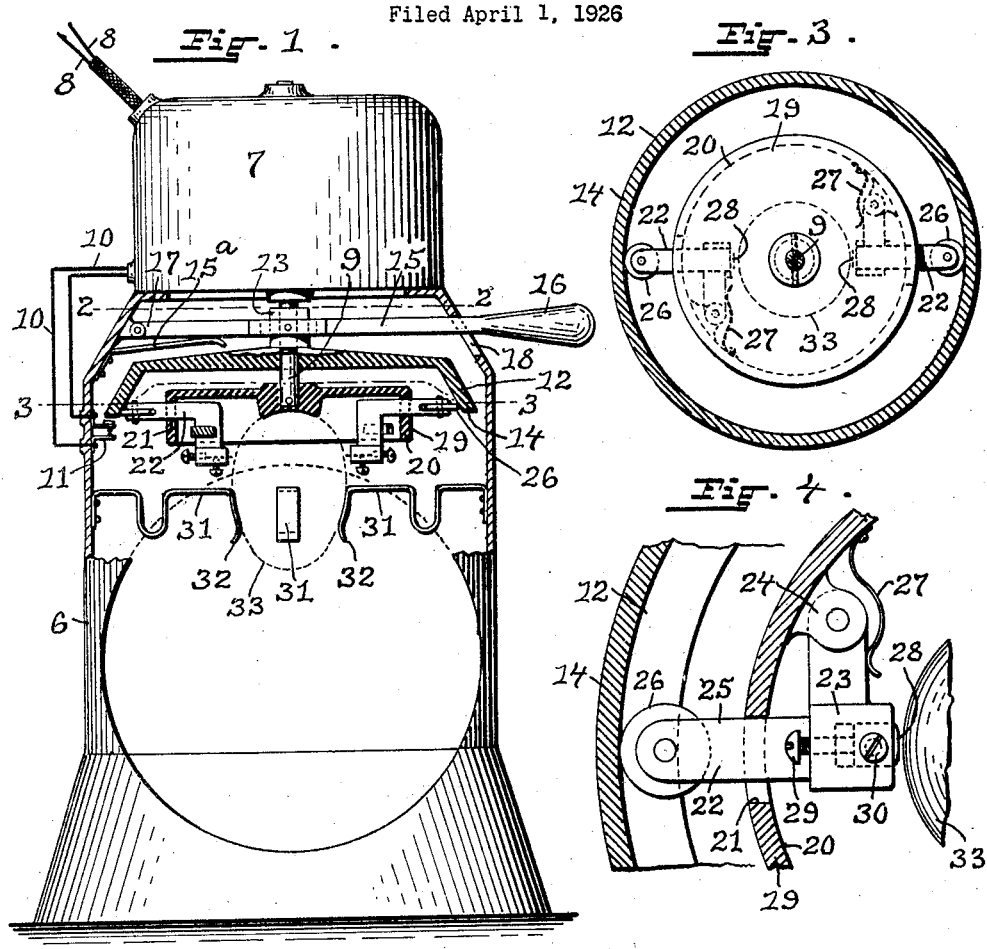
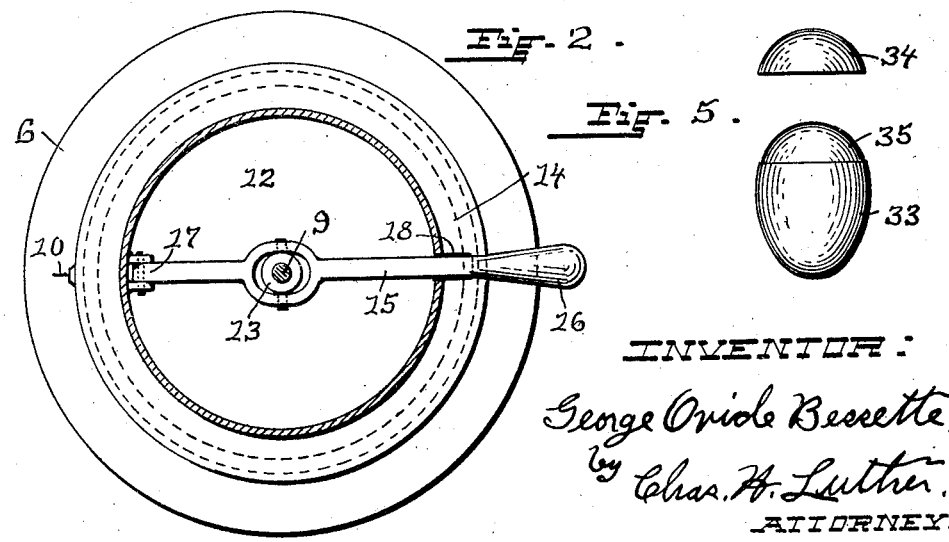
INVENTOR:
George Oriole Bessette,
by Chas. H. Luther.
ATTORNEY.

Patented Nov. 15, 1927.  1,648,979

UNITED STATES PATENT OFFICE.

GEORGE OVIDE BESSETTE, OF MARIEVILLE, RHODE ISLAND, ASSIGNOR OF ONE-HALF TO EDWARD MESSERE, OF MARIEVILLE, RHODE ISLAND.

EGG OPENER.

Application filed April 1, 1926. Serial No. 99,073.

My invention has reference to mechanical means for cutting fresh or cooked eggs open and more particularly to an improvement in an egg opener that will make a circular transverse cut through the egg shell around a predetermined part of the egg, the egg being held in the egg opener so that the cut portion of the egg shell will be retained on the egg, when the egg is removed, or until it is required to remove the cut off portion of the egg shell, from the egg.

The object of my invention is to improve the construction of an egg opener, whereby an egg is cut open, without fracturing or breaking the egg shell into pieces.

A further object of my invention is to cut a cooked egg open in such a way that the cut portion of the egg shell is retained on and served with the egg, thereby keeping the egg hot or warm until the cut portion of the shell is removed, to eat the egg.

Another object of my invention is to cut a fresh egg open in such a way that the cut portion of the egg shell is retained on the egg, until the egg is removed from the egg opener and used for cooking purposes, the retained cut portion of the shell holding the contents of the egg in the egg until the cut off portion of the shell, is removed from the egg.

My invention consists in the peculiar and novel construction of an egg opener, said egg opener having details of construction as will be more fully set forth hereinafter and claimed.

Figure 1 is a front vertical view of my improved egg opener, shown partly in section.

Figure 2 is a transverse sectional view through the egg opener taken on line 2, 2, of Figure 1, looking down.

Figure 3 is a transverse sectional view through the egg cutter operating mechanism, taken on line 3, 3, of Figure 1, looking down.

Figure 4 is an enlarged detail plan view of one of the knife blade arms, for cutting an egg, shown partly in section, and looking upwards, and Figure 5 is a side view of an egg after the egg has been cut by my improved egg opener and showing the cut portion of the egg shell removed from the egg.

In the drawing 6 indicates the casing of my improved egg opener having a hand opening in the front, 7 an electric motor on the top of the casing and having wires 8, 8, for connecting the motor to a source of electricity, not shown, and 9 a motor driving shaft which extends downwards centrally into the casing 6. Wires 10, 10, operatively connect the motor 7 with a spring arm electric switch 11, on the inside of the casing 6, the switch 11 being normally in an open position, as shown in Figure 1. This motor 7 may be of any well known make and is shown only to illustrate a complete operative device and is no part of my invention, per se.

Reciprocally supported on the driving shaft 9 is a circular inverted dish shaped knife operating member 12, having a hub 13 on the driving shaft 9 and a circular downwardly and outwardly inclined rim 14, as shown in Figures 1 and 3. Pivotally secured to the hub 13 is a horizontal hand operating lever 15, having an outside handle 16. This lever 15 is pivotally secured at its inner end 17 to a lug on the casing 6 and extends outwards through a vertical slot 18 in the casing 6 and it is held normally in its upward position by a whip spring $15^a$ secured at one end to the casing 6 and engaging the lever 15.

Fixed to the lower end of the driving shaft 9 is a circular knife arm supporting member 19 in the form of an inverted dish having a circular rim 20 in which are oppositely disposed slots 21, 21. The knife arm supporting member 19 carries oppositely disposed L shaped knife arms 22, 22, each knife arm 22 having an inner end 23 pivotally secured to a lug 24 on the circular rim 20 and a straight outer arm 25 which extends radially through a slot 21 in the circular rim 20 and has a small wheel 26 rotatably secured in the outer end of the arm 25 and engaging the inner face of the inclined rim 14 on the knife operating member 12. A whip spring 27 secured at one end to the rim 20 and engaging with the knife arm 22, holds the wheel 26 against the rim 14, under spring tension. In the inner end of the knife arm 22 is adjustably secured a thin cutting blade 28, adjusted by a screw 29 bearing against the inner end of the cutting blade 28 and held in its adjusted position by a set-screw 30, as shown in Figure 4.

Spring egg holding and centering arms 31, 31, are secured at their outer ends to the inside of the casing 6, the inner ends 32, 32, being shaped to hold an egg centrally under spring tension and in the position for cutting open the egg. A smooth depressed central portion of the knife operating member 12 forms a stop to limit the upward movement of the egg, as shown in Figure 1.

33 indicates an egg and 34 the cut off portion of the egg shell, removed from the egg, thereby exposing the eatable inside 35 of the egg, which in a cooked egg will appear as in Figure 5.

In the operation of my improved egg opener with the wires 8, 8, connected to a source of electricity, not shown, the operator takes an egg in his hand, preferably large end up and inserting his hand through the hand opening in the casing, inserts the egg upwards into the spring arms 31, 31, so that the upper end of the egg bears against the smooth depressed center of the knife operating member 12. He then by the handle 16, depresses the lever 15, which in turn depresses the knife operating member 12. The edge of the knife operating member 12 engages with and closes the electric switch 11, thereby causing the electric motor 7, driving shaft 9 and knife arm supporting member 19, to revolve. The wheels 26, 26, on the knife arms 22, 22, now running on a reduced circumference of the inclined rim 14, causes the knife arms 22, 22, to move inwards towards the egg and when the lever 15 is depressed the required distance, the cutting blades 28, 28, now revolving around the egg, will cut a circular cut around and through the egg shell, the inner end of the knife arms 22, 22, bearing against the egg, forms stops against the egg, to limit the depth of the cut. The cut egg is then removed from the egg opener, the cut portion of the egg shell, staying in place on the egg until it is required to remove it from the egg.

Having thus described my invention I claim as new:—

1. In an egg opener, a knife blade adapted to revolve in a circular direction around an egg, means for revolving the knife blade, means for adjusting the circular path of the knife blade and spring means for detachably holding an egg inside of the circular path of the knife blade, for the purpose as described.

2. In an egg opener, a driving shaft, a knife arm holding member fixed to the shaft, a knife arm movably secured to the knife arm holding member, a knife blade adjustably secured in the inner end of the knife arm, means for revolving the driving shaft, whereby the knife blade revolves in a circular direction, means for adjusting the circular path of the knife blade, means for adjusting the knife blade in the knife arm and spring means for detachably holding an egg inside of the circular path of the knife blade, for the purpose as described.

3. In an egg opener, a driving shaft, a knife arm holding member fixed to the driving shaft, a knife arm operating member reciprocally supported on the driving shaft, a knife arm movably secured to the knife arm holding member, a knife blade adjustably secured in the inner end of the knife arm, means for revolving the driving shaft whereby the knife blade revolves in a circular direction, means for operating the knife arm operating member, to adjust the circular path of the knife blade, means for adjusting the knife blade in the knife arm and spring means for detachably holding an egg inside of the circular path of the knife blade, for the purpose as described.

4. In an egg opener, a casing having a hand opening, a driving shaft rotatably supported in the casing, a knife arm holding member fixed to the driving shaft, means for revolving the driving shaft, a knife arm operating member reciprocally supported on the driving shaft, a lever pivotally secured to the casing and to the knife arm operating member and extending outwards through an opening in the casing, said knife arm operating member having an inclined rim, a knife arm movably secured to the knife arm holding member, a knife blade adjustably secured in the inner end of the knife arm, a wheel rotatably secured in the outer end of the knife arm and contracting with the inclined rim of the knife arm operating member, spring means for holding the wheel in contact with the inclined rim of the knife arm operating member, spring arms secured to the casing and having free ends shaped to detachably hold an egg inside of the circular path of the cutting blade, means on the knife arm forming a stop to limit the cut of the knife blade and spring means for holding the lever in its normal position, whereby on inserting an egg into the spring arms, revolving the shaft and operating the lever, a circular cut is made in the shell of an egg, for the purpose as described.

In testimony whereof, I have signed my name to this specification.

GEORGE OVIDE BESSETTE.